(12) United States Patent
Burshteyn

(10) Patent No.: US 10,324,892 B2
(45) Date of Patent: *Jun. 18, 2019

(54) SECURITY VIA DATA CONCEALMENT

(71) Applicant: CryptoMove, Inc., Walnut Creek, CA (US)

(72) Inventor: Boris Burshteyn, Walnut Creek, CA (US)

(73) Assignee: CRYPTOMOVE, INC., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/851,644

(22) Filed: Dec. 21, 2017

(65) Prior Publication Data

US 2018/0137130 A1    May 17, 2018

Related U.S. Application Data

(63) Continuation of application No. 15/668,459, filed on Aug. 3, 2017, now Pat. No. 9,898,473, which is a (Continued)

(51) Int. Cl.
*G06F 21/00* (2013.01)
*G06F 16/11* (2019.01)
(Continued)

(52) U.S. Cl.
CPC ........ *G06F 16/122* (2019.01); *G06F 21/6218* (2013.01); *H04L 9/0631* (2013.01); (Continued)

(58) Field of Classification Search
CPC ......... G06F 17/30082; G06F 17/30138; G06F 21/602; G06F 17/30194; H04L 63/0428; H04L 63/06; H04L 2209/16
See application file for complete search history.

(56) References Cited

U.S. PATENT DOCUMENTS 7,707,117 B1    4/2010    Jimenez et al.
8,473,438 B2    6/2013    Potkonjak
(Continued)

FOREIGN PATENT DOCUMENTS

EP    2 590 451 A1    8/2013
JP    2004336702 A    11/2004
(Continued)

OTHER PUBLICATIONS

International Search Report and Written Opinion dated Sep. 1, 2016 of International Application No. PCT/2016/033098, filed May 18, 2016. (9 pages).

(Continued)

*Primary Examiner* — Mahfuzur Rahman
(74) *Attorney, Agent, or Firm* — Perkins Coie LLP

(57) ABSTRACT

Methods, apparatuses, and embodiments related to improving security of data that is stored at a data store distributed over a computer network. In an example, source data to be protected is partitioned into multiple files, and each file is obfuscated, such as by being encrypted, to created multiple obfuscated data files. Information as to how each obfuscated data file was obfuscated is stored in an associated trace file. The multiple obfuscated data files are moved around a computer network via a data movement process that includes sending each of the multiple obfuscated data files to a different randomly selected computer, where the computer further obfuscates the obfuscated data the trace file, and sends the further obfuscated data and trace file to a next randomly selected computer.

28 Claims, 7 Drawing Sheets

Related U.S. Application Data continuation of application No. 15/158,198, filed on May 18, 2016, now Pat. No. 9,753,931.

(60) Provisional application No. 62/163,804, filed on May 19, 2015.

(51) Int. Cl.
*H04L 29/06* (2006.01)
*G06F 21/62* (2013.01)
*H04L 9/06* (2006.01)
*H04L 9/08* (2006.01)

(52) U.S. Cl.
CPC .......... *H04L 9/0643* (2013.01); *H04L 9/0891* (2013.01); *H04L 9/0894* (2013.01); *H04L 63/0428* (2013.01); *H04L 63/06* (2013.01); *H04L 2209/16* (2013.01)

(56) References Cited

U.S. PATENT DOCUMENTS

| | | |
|---|---|---|
| 9,753,931 B2 | 9/2017 | Burshteyn |
| 10,037,330 B1 | 7/2018 | Burshteyn |
| 2004/0139340 A1 | 7/2004 | Johnson et al. |
| 2007/0061612 A1 | 3/2007 | Henderson et al. |
| 2012/0265737 A1 | 10/2012 | Potkonjak |
| 2012/0272329 A1 | 10/2012 | Grammer et al. |
| 2014/0019756 A1 | 1/2014 | Krajec et al. |
| 2014/0237614 A1 | 8/2014 | Irvine et al. |
| 2014/0337985 A1 | 11/2014 | Muyshondt |
| 2015/0106195 A1 | 4/2015 | Holman et al. |
| 2016/0342608 A1 | 11/2016 | Burshteyn |
| 2017/0161128 A1 | 6/2017 | Hallowell et al. |
| 2017/0357658 A1 | 12/2017 | Burshteyn |

FOREIGN PATENT DOCUMENTS

| | | |
|---|---|---|
| JP | 2007213405 A | 8/2007 |
| JP | 2010517119 A | 5/2010 |
| WO | WO 0004681 A1 | 1/2000 |

OTHER PUBLICATIONS

Non-Final Office Action dated Aug. 12, 2016 of U.S. Appl. No. 15/158,198 by Burshteyn, B., filed May 18, 2016.
Notice of Allowance dated May 9, 2017 of U.S. Appl. No. 15/158,198 by Burshteyn, B., filed May 18, 2016.
Notice of Allowance dated Oct. 17, 2017 of U.S. Appl. No. 15/668,459 by Burshteyn, B., filed Aug. 3, 2017.
Notice of Allowance dated Aug. 10, 2018 for Japanese Patent Application No. JP201756472, 3 pages.
Notice of Allowance dated Jun. 4, 2018 of U.S. Appl. No. 15/937,694 by Burshteyn, B. filed Mar. 27, 2018.
U.S. Appl. No. 16/049,711 of Burshteyn, B. filed Jul. 30, 2018.
Notice of Allowance dated Feb. 27, 2018 for Israel Patent Application No. 255745, 2 pages.
U.S. Appl. No. 15/937,694 of Burshteyn, B. filed Mar. 27, 2018.

SECURITY VIA DATA CONCEALMENT

CROSS REFERENCE TO RELATED APPLICATIONS

This application is a continuation of U.S. patent application Ser. No. 15/668,459, filed on Aug. 3, 2017, which is a continuation of U.S. patent application Ser. No. 15/158,198, filed on May 18, 2016, now U.S. Pat. No. 9,753,931, issued Sep. 5, 2017, which claims priority to U.S. Provisional Patent Application No. 62/163,804, filed May 19, 2015, the entire contents of all of which are hereby incorporated by reference in their entirety.

BACKGROUND

Security is an important concern in computer networks. One method of protecting data is to prevent unauthorized entry to a computer network via static security measures such as firewalls, passwords, dongles, physical keys, isolation, biometrics, or other measures. In spite of such measures, attackers have gained access to such theoretically secure networks. Once an attacker gains access to a network, the attacker is often able to obtain sensitive data, such as names, birth dates, social security numbers, bank account information, credit card information, intellectual property, etc. Attackers have successfully obtained such information from major corporations, such as retailers, health insurance providers, banks, etc. In some cases, an attacker is an "inside" attacker, such as an employee or some other person with authorized access to a secure network, a storage device. etc. In such cases, the attacker may be able to obtain sensitive data for nefarious purposes without needing to bypass any perimeter security that prevents unauthorized entry to the secure network.

BRIEF DESCRIPTION OF THE DRAWINGS

One or more embodiments are illustrated by way of example in the figures of the accompanying drawings, in which like references indicate similar elements.

DETAILED DESCRIPTION

Figure 1:
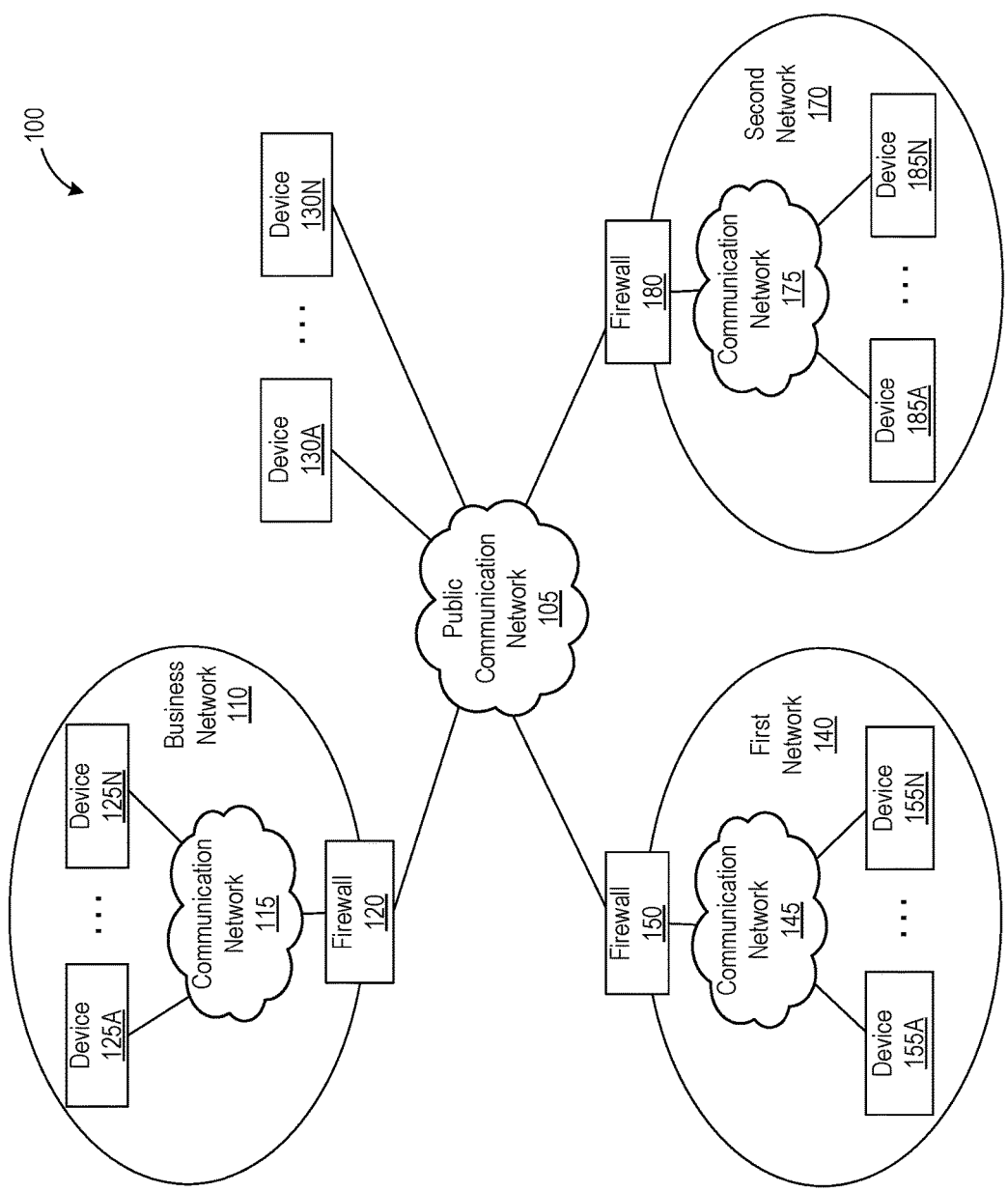
FIG. 1 is an illustration of a networking environment, consistent with various embodiments.

Introduced here is technology for improving security of data that is stored at a data store distributed over a computer network. When users encrypt and save secret information in a computerized persistent data store, the stored data often becomes the target of cryptographic attacks. During an attack, obtaining data of a target secret, such as encrypted data that includes the target secret, is a necessary step in the sequence of deciphering attempts. The purpose of the attack may vary from decoding the encrypted data, to understanding the encryption method, to discovering encryption keys for use in subsequent attacks, etc. However, in all cases, identifying the data to target with an attack is a mandatory condition without which no cryptographic attack can start, much less advance in achieving its goals.

Without data identification, a cryptographic attack is futile. The disclosed technology enables a continuous concealment process that obfuscates stored data, changes data names and keeps moving the data around a distributed data store. Obfuscating data involves modifying the data in a way that increases the difficulty of determining the identity of a portion of the data. Because of this dynamic approach, unauthorized individuals, referred to herein as "attackers", are prevented from identifying target data by its name, size, content, access time, use patterns, etc. Therefore, an attacker is prevented from attacking target data simply because the attacker does not know which data to attack. Even if an attacker attempts to get a hold of an entire data store, the attacker's chances are slim when the data store is spread over a network. At the same time, a brute force attack on a data store protected via the disclosed technology is infeasible because of its high cost in both time and computing resources. In one example. just to locate a single protected file before mounting a cryptographic attack on that protected file, according to a calculation, one has to sift through about $2^{476}$ combinations of parts in a distributed data store of 10,000 files, where each file is split into 12 parts with 4 copies (3 for backup and redundancy purposes). Note how much higher this number is than the estimated number of atoms in the Universe, which is $2^{272}$. By continuously obfuscating and moving stored data, the disclosed technology makes identification of a particular protected data file practically impossible.

Just encrypting the protected file content and its name, without preventing its identification, still jeopardizes security. In a case where the attacker obtains encrypted data, the attacker might succeed in decrypting the encrypted data. Alternatively, the attacker might blackmail the encrypted data owner despite being unable to decrypt the data. Further, encryption methods considered safe today may become unsafe tomorrow because of the progress in the deciphering techniques. In some cases, an attacker may be able to apply vast amounts of computing resources, thereby enabling a successful brute force attack that results in the decryption of the protected file and access to its secret information. Additionally, an attacker may possess a secret algorithm that deciphers a seemingly impregnable encryption scheme. Therefore, having an attacker being able to identify the encrypted data is a serious risk in and of itself.

If the means of identification of a target file is unprotected, then an attacker may be able to choose a file just by the file name, size, content, access time, use pattern, etc. Note that sometimes an attacker is an outsider who procures help from an insider, or is himself an insider familiar with the data store. Such an insider may be able to identify the data based on his insider's knowledge. Also, in some cases it is enough to identify just a portion of the needed data as the data contains references to the remaining parts. Defeating an attack by denying the ability to isolate the target data serves as strong protection, not only against an external attacker who successfully bypassed access controls, but also against an internal attacker with the proper storage access, such as a malevolent system administrator.

Some techniques for protecting data rely on preventing an attacker from gaining access to the secure network at which the data is stored. However, as is apparent from the frequent news reports of computer network breaches at major corporations and businesses, such static perimeter network security techniques are inadequate in many cases.

The disclosed technology enables a computer system, for example a computer system of a business, to protect data even when an attacker has access to the network at which the data is stored. In an example, a business protects source data via a continuous concealment process that includes an initial obfuscation process and a data movement process. The initial obfuscation process involves a computer system of the business generating multiple obfuscated data files based on the source data, where all of the obfuscated data files are needed to regenerate the source data. The initial obfuscation process includes the computer system obfuscating and partitioning the source data, which results in multiple files, and further includes the computer system obfuscating data of the multiple files, which results in the multiple obfuscated data files. Obfuscating data can include, for example, compressing, partitioning, encrypting, bit-scattering, cyclically exclusive-or'ing (XOR'ing), etc. the selected data, or adding random data to the selected data, among others.

The data movement process of the example starts with the computer system sending each of the obfuscated data files to a different initial computer system. Each of the initial computer systems initiates a propagation process that includes further encrypting, randomly renaming, and sending, after a predetermined interval, the received obfuscated data file to a randomly selected computer, which continues the propagation process by further encrypting, randomly renaming, and sending, after another predetermined interval, the obfuscated data file to another randomly selected computer. In some embodiments, after the predetermined interval, the obfuscated data file is sent to an intelligently selected computer. In some embodiments, the randomly selected names are generated so as to be unique, such as a randomly generated cryptographic name. For example, a name can be cryptographically generated based on an encryption key or seed. In other embodiments, the randomly selected names are generated randomly, but in a pre-determined fashion. In yet other embodiments, the obfuscated data file is intelligently renamed. The various computers utilized during the data movement process can be on a private network, such as computers on a private network of the business, can be part of an unbounded network, such as computers on networks of one or more cloud compute/storage providers, etc., or any combination thereof.

In order for an attacker to successfully obtain access to data protected by the disclosed technology, the attacker must first gain access to all of the obfuscated data files for the protected data. Because the obfuscated data files are randomly named and are being randomly moved amongst a pool of computers (which may span the networks of multiple independent businesses), locating the obfuscated data files is prohibitively difficult, even for an inside attacker. Further, because all of the obfuscated data files are needed to regenerate the source data, any attacker that does not possess all of the obfuscated data files is effectively prevented from successfully regenerating the source data.

In an example that helps to demonstrate the difficulty of determining the source data for even an inside attacker, a business uses the disclosed technology to protect 10,000 source files that are stored in a data store. During the initial obfuscation process for each of the 10,000 source files, each source file is processed to create 12 obfuscated data files. For redundancy and backup reasons, an additional 3 versions of each of the obfuscated data files are also created, for a total of 4 obfuscated versions of each obfuscated data file, resulting in 4*12*10,000, or 480,000 obfuscated data files in the data store.

In order to start a cryptographic attack on selected source data, a correct set of 12 obfuscated data files needs to be identified and properly aligned. However, because the 480,000 obfuscated data files cannot be distinguished from each other based on file name, size, content, access time, use pattern, etc., an attacker would need to perform a brute force attempt to identify and order a unique set of 12 obfuscated data files needed to regenerate the selected source file. An analysis based on the number of obfuscated data files and the permutations of the obfuscated data files determined that there are $2^{476}$ possible ordered combinations of obfuscated data files. As previously discussed, this number is more than the estimated number of atoms in the Universe, which is $2^{272}$.

References in this description to "an embodiment," "one embodiment," or the like, mean that the particular feature, function, structure or characteristic being described is included in at least one embodiment of the present disclosure. Occurrences of such phrases in this specification do not necessarily all refer to the same embodiment. On the other hand, the embodiments referred to also are not necessarily mutually exclusive.

Further, in this description the term "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

Note that in this description, any references to sending or transmitting a message, signal, etc. to another device (recipient device) means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

Also note that in this description, any references to sending or transmitting a message, signal, etc. to another device (recipient device) means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

FIG. 1 is an illustration of a networking environment, consistent with various embodiments. Network environment 100 includes three networks that are protected by a firewall, business network 110, first network 140, and second network 170. Each of the three networks includes a communication network that enables data communication between computing devices that are members of the network. For example, business network 110 includes communication network 115, which includes a plurality of devices (e.g., device 125A, device 125N, etc., referred to collectively as "devices 125"), which enables devices 125 to communicate with each other, with firewall 120, etc. First network 140 includes communication network 145, which includes a plurality of devices (e.g., device 155A, device 155N, etc., referred to collectively as "devices 155"), which enables devices 155 to communicate with each other, with firewall 150, etc. Second network 170 includes communication network 175, which includes a plurality of devices (e.g., device 185A, device 185N, etc., referred to collectively as "devices 185). which enables devices 185 to communicate with each other, with firewall 180, etc.

The firewall of each of the three networks acts as a barrier to protect the network by keeping unauthorized network traffic out of the network. For example, firewall 120 protects business network 110, firewall 150 protects first network 140, and firewall 180 protects second network 170. Public communication network 105 is a public network, such as the Internet or any other public network. Public communication network 105, which includes a plurality of devices (e.g., device 130A, device 130N, etc.), enables devices 130, firewall 120, firewall 150, firewall 180, etc. to all communicate with each other.

Communication networks 115, 145, and 175, and public communication network 105, can be any type of network that enables data communication between computers. In various embodiments, one or more of communication networks 115, 145, and 175, and public communication network 105 are or include any of a local area network (LAN), a wide area network (WAN), a virtual private network (VPN), a private network, a public network, a cellular network, a short-range wireless network, a wireless local area network (WLAN), etc. The cellular network can be any of various types, such as code division multiple access (CDMA), time division multiple access (TDMA), global system for mobile communications (GSM), long term evolution (LTE), 2G, 3G, 4G, etc. The short-range wireless network, which is used for short-range wireless communications, can also be any of various types, such as Bluetooth, Bluetooth low energy (BLE), near field communication (NFC), etc. The WLAN can similarly be any of various types, such as the various types of IEEE 802.11 networks, among others. Public communication network 105 can be any type of public communication network, such as the Internet.

Devices 125, 130, 155, and 185 can be any type of computing device, such as a desktop computer, a laptop computer, a file server, a network attached storage (NAS) device, a mobile device, or a server, among others. Examples of mobile devices include smart phones, tablets, portable media devices, wearable devices, laptops, and other portable computers.

In some embodiments, first network 140 represents a first cloud storage or compute provider, and second network 170 represents a second cloud storage or compute provider, where the first and second cloud storage or compute providers are separate independent businesses.

Figure 2:
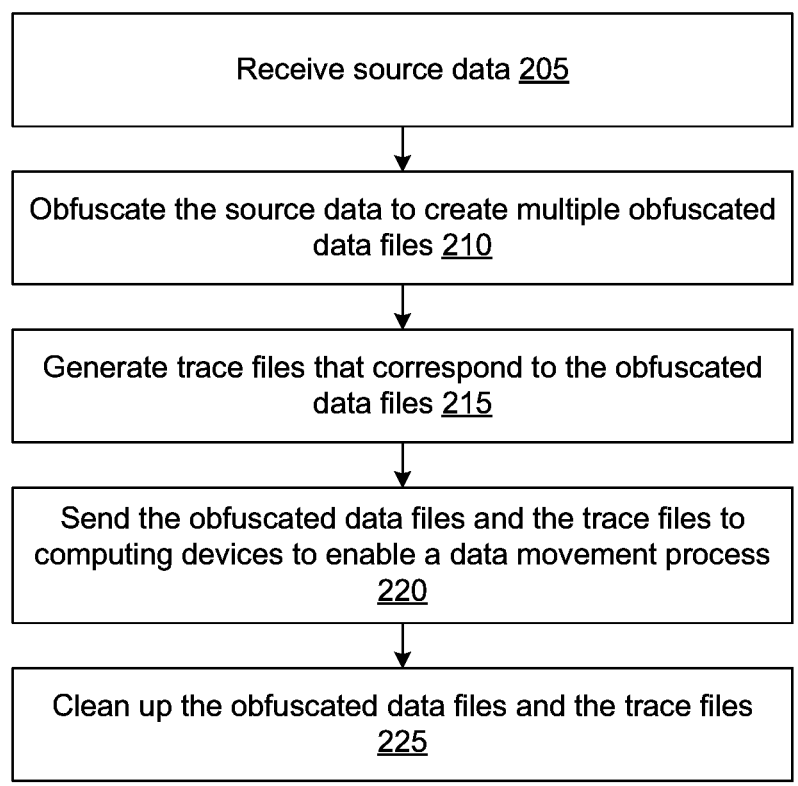
FIG. 2 is a flow diagram that illustrates a method for continuous concealment of data, consistent with various embodiments.

FIG. 2 is a flow diagram that illustrates a method for continuous concealment of data, consistent with various embodiments. At block 205, a computer system receives source data. The computer system can be any type of computing device, for example, any of devices 125, 130, 155, or 180 of FIG. 1, among others. Further, the computer system can receive the source data via any of various mechanisms. For example, another computer system can send the source data to the computer system, which receives the source data. As another example, a user can input the source data via an input mechanism of the computer system. Examples of input mechanisms include a word processor application, a spreadsheet application, a voice recognition application, an optical recognition application, a keyboard, a microphone, a camera, etc.

At block 210, the computer system obfuscates the source data to create multiple obfuscated data files. The multiple obfuscated data files can include one or more sets of obfuscated data files, where all obfuscated data files of any selected set of the obfuscated data files are needed to regenerate the source data. In some embodiments, multiple sets of obfuscated data files are created for redundancy or backup reasons. When multiple sets of obfuscated data files are created, any of the sets can be used to regenerate the source data.

Obfuscating selected data includes transforming the selected data, or a version of the selected data, via execution of one or more algorithms, such as a compression algorithm, a data partitioning algorithm, an encryption algorithm, a bit-scattering algorithm, a data permutation algorithm, a cyclical exclusive-or (XOR) algorithm, etc. Obfuscating selected data can further include transforming the selected data by adding random data to the selected data or a version of the selected data. In some embodiments, the encryption algorithm adds a cryptographically calculated digital digest to the selected data. For example, the encryption algorithm can utilize a Secure Hash Algorithm (SHA), such as the SHA-512 algorithm, which can append a cryptographically calculated digital digest to the selected data.

A version of selected data includes the selected data or any data that is derived from the selected data, such as data that is derived from the selected data via execution of an algorithm that transforms the selected data. Further, data that is derived from a version of the selected data is itself a version of the selected data. For example, each of the following is a version of selected source data: the selected source data; data generated via execution of a compression algorithm that takes as input the selected source data; data generated via execution of an encryption algorithm that takes as input the data generated via the execution of the compression algorithm that takes as input the selected source data. Block 210 can be implemented via the method depicted in flow diagram 300 of FIG. 3, among others. It is helpful to refer at this time to the example of FIG. 3.

Figure 3:
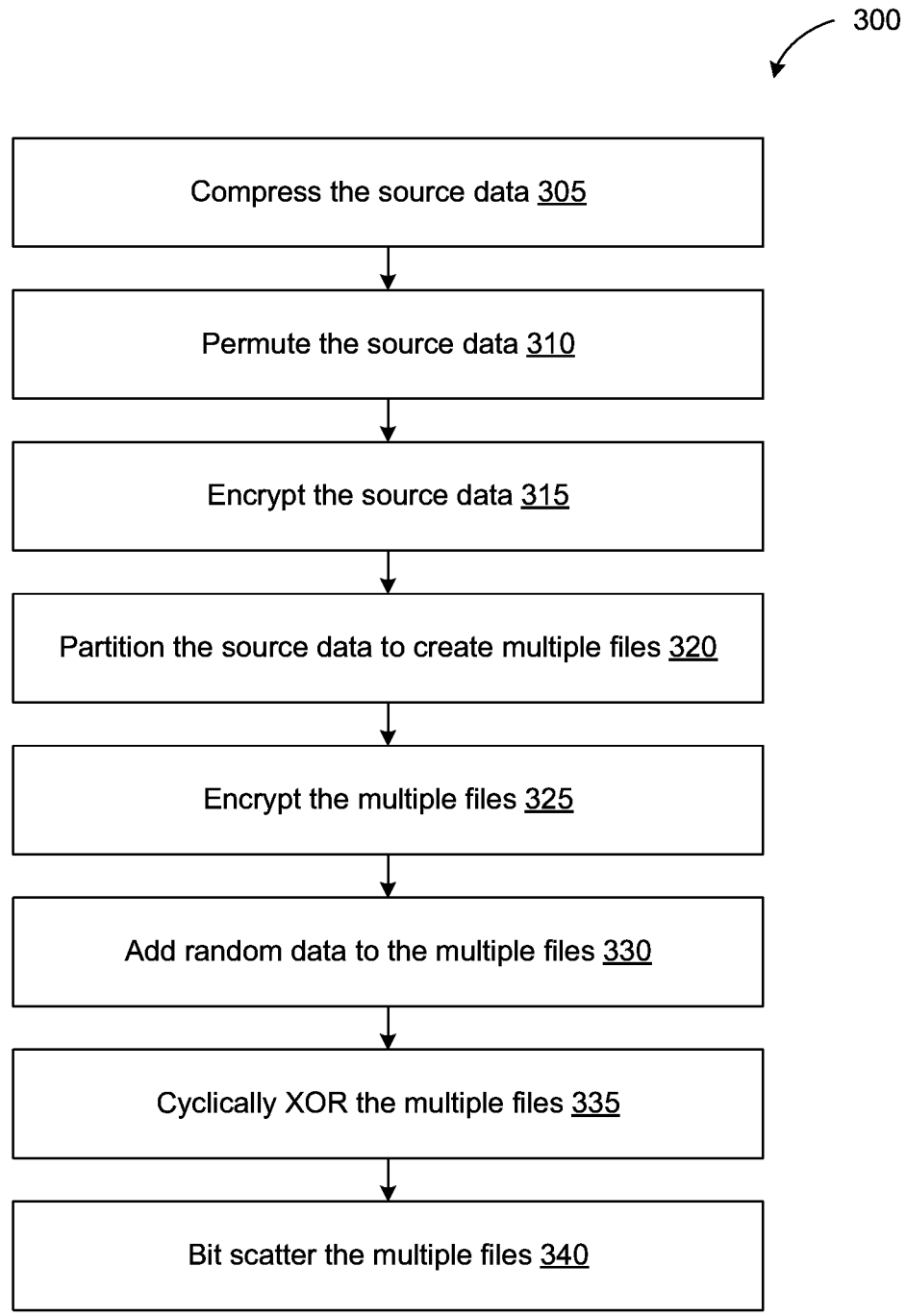
FIG. 3 is a flow diagram that illustrates a method for obfuscating source data to create multiple obfuscated data files, consistent with various embodiments.

FIG. 3 is a flow diagram that illustrates a method for obfuscating source data to create multiple obfuscated data files, consistent with various embodiments. Block 210 of FIG. 2 can be realized via the method of flow diagram 300, among others. At block 305, a computer system, such as the computer system of FIG. 2, compresses source data or a version of the source data by executing any of various compression algorithms, resulting in creation of a compressed version of the source data.

At block 310, the computer system permutes source data or a version of the source data by executing any of various permutation algorithms, resulting in creation of a permuted version of the source data. A permutation algorithm can permute data at any selected granularity, such as at the bit level, the byte level, the word level, the block level, etc. Permutation algorithms are well known in the art, as is demonstrated by http://www.cse.uconn.edu/~zshi/course/cse5302/ref/yhilewitz_thesis.pdf (an archived version of which is available at https://web.archive.org/web/20160423040108/http://www.cse.uconn.edu/~zshi/course/cse5302/ref/yhilewitz_thesis.pdf).

In some embodiments, permutation data files are stored in the data store along with obfuscated data files. Each obfuscated data file can have an associated permutation data file, which includes information as to how to reverse the permutation algorithm for the associated obfuscated data file. A permutation data file is stored in the data store as any other obfuscated data file or permutation data file. For source data, such as the source data of block 205 of FIG. 2, that is partitioned into p files (e.g., block 210, block 320), each file with c copies, there can be 2*p*c associated data files in the data store. This results from each obfuscated data file having its respective permutation, travelling the store during the data movement process independently from its associated obfuscated data file or other obfuscated data files, or other permutation data files. Permutation data files can travel in substantially the same way as obfuscated data files during the data movement process, with each permutation data file being accompanied with its own trace file.

The permutation data files are not distinguishable by appearance to the computing devices, nor is the permutation data treated any differently by the computing devices than any other obfuscated data file or permutation file. When moving permutation files, computing devices send the same kind of pulse messages as are sent with obfuscated data files, and the permutation data files are retrieved together with the obfuscated data files upon data retrieval for source data regeneration (e.g., block 625 of FIG. 6). As discussed, computing devices process permutation data files and obfuscated data files in a substantially similar manner during the data movement process. However, upon retrieval of data files for source data regeneration, when an originating computer system (e.g., the computer system of block 205 of FIG. 2) receives the obfuscated data files and permutation data files retrieved for source data regeneration, the originating computer system uses data of the permutation data files to un-permute the data of the obfuscated data files.

At block 315, the computer system encrypts source data or a version of the source data by executing any of various encryption algorithms, resulting in creation of an encrypted version of the source data. In some embodiments, the encryption algorithm requires an encryption key or a seed in addition to the data to be encrypted. The encryption key or the seed can be exclusive to the computer system (e.g., used for encrypting data exclusively by the computer system, and not by any other computing device). For example, the encryption key and the seed can be exclusive to the computer system.

At block 320, the computer system partitions source data or a version of the source data by executing any of various data partition algorithms, resulting in creation of multiple files. A data partitioning algorithm divides input data into multiple output files, and can divide the input data such that each of the output files is needed to regenerate the input data. The input data can be partitioned in any of various ways. For example, the input data can be partitioned into even sized, random sized, semi-random sized, etc. contiguous portions, and the contiguous portions can be used to create the output files, where each output file includes a portion of the input data that is contiguous. As another example, the input data can be partitioned into non-contiguous randomly selected portions (e.g., bit, bytes, words, blocks, etc.), semi-randomly selected portions, deterministically selected portions, etc., and the selected portions can be merged to create the output files, where each output file includes non-contiguous input data.

At block 325, the computer system encrypts the multiple files or versions of the multiple files by executing any of various encryption algorithms, resulting in creation of encrypted versions of the multiple files. In some embodiments, the encryption algorithm requires an encryption key or a seed in addition to the data to be encrypted. In some embodiments, the encryption key is private to the computer system (e.g., the encryption key is not used by any other computing device in the execution of an encryption algorithm).

At block 330, the computer system adds randomly generated data, semi-randomly generated data, deterministically generated data, etc. to the multiple files or to versions of the multiple files by executing any of various data padding algorithms, resulting in creation of padded versions of the multiple files. In some embodiments where the multiple files are of different size, the data added by the computer system causes each of the multiple files to be of a same size.

At block 335, the computer system cyclically XORs the multiple files or versions of the multiple files by executing any of various cyclical XOR algorithms, resulting in creation of XORed versions of the multiple files. In an example, a first file and a second file of the multiple files are XORed to create a version of the first file, the second file and a third file of the multiple files are XORed to create a version of the second file, etc. In some embodiments, when two files to be XORed are not of a same size, the smaller of the two files are padded with zeros, with ones, with randomly generated data, with semi-randomly generated data, with deterministically generated data, etc. to facilitate execution of the XOR algorithm. In other embodiments, when two files to be XORed are not of a same size, only the first N bits or bytes of both files are XORed. N can equal, for example, the size of the smaller of the two files.

At block 340, the computer system bit scatters the multiple files or versions of the multiple files by executing any of various bit scatter algorithms, resulting in creation of bit scattered versions of the multiple files. Bit scatter algorithms are well known in the art, as is demonstrated by the previously mentioned Hilewitz reference. In some embodiments, other algorithms that obfuscate data by transforming the data are executed to create versions of the source data or of the multiple files. The multiple obfuscated data files of block 210 of FIG. 2 can be the versions of the multiple files created by any of blocks 320 to 340, or can be versions of the multiple files created by any other algorithm that is executed as part of block 210.

Returning to FIG. 2, at block 215, the computer system generates trace files that correspond to the obfuscated data files. In some embodiments, a one to one mapping exists between the obfuscated data files and the trace files, such that each trace file maps to a single obfuscated data file, and each obfuscated data file maps to a single trace file. A trace file includes information as to how the obfuscated data file to which the trace file maps was created. For example, a trace file can include information as to the particular algorithms that were run to generate the obfuscated data file to which the trace file maps, the sequencing of the particular algorithms that were run, configuration information for the particular algorithms that were run, etc. In an example, the trace file that maps to an obfuscated data file includes information that the obfuscated data file was created by initially executing a particular compression algorithm on source data, then by executing a particular permutation algorithm, then by executing a particular encryption algorithm with a particular encryption key and seed, then by executing a particular data partition algorithm with a particular set of control values, and finally by executing the particular encryption algorithm with the particular encryption key and seed.

In some embodiments, to enable a computer system to regenerate particular source data, in addition to needing access to a set of obfuscated data files that correspond to the particular source data, the computer system needs access to the trace files that correspond to the set of obfuscated data files. The obfuscated data files are needed as the obfuscated data files contain the information of the particular source data, albeit in an obfuscated form. The trace files are needed as the trace files contain information as to how the particular source data can be regenerated based on the obfuscated data files. When the obfuscated data files were created by following a certain creation process, the trace files include information that enables the creation process to be reversed, and that enables the particular source data to be regenerated based on the obfuscated data files.

A trace file can further include identifying information for the obfuscated data file to which the trace file maps. The identifying information enables the obfuscated data file to be positively identified. In some embodiments, the identifying information is a hash value that is generated by a hash algorithm based on the contents of obfuscated data file, and that is unique to the contents of the obfuscated data file. In other words, any file that contains data that is different from the data of the obfuscated data file will have a different hash value than the obfuscated data file.

At block 220, the computer system sends the obfuscated data files and the trace files to computing devices to enable a data movement process. The computing devices of block 220 can be, for example, any of devices 125, 130, 155, or 185 of FIG. 1, among others. In some embodiments, the computer system randomly, semi-randomly, deterministically, etc. selects a first computing device from a set of computing devices, and the computer system sends a first one of the obfuscated data files, and a trace file that maps to the first obfuscated data file, to the first computing device. The computer system similarly selects a second computing device, and sends a second one of the obfuscated data files, and a trace file that maps to the second obfuscated data file, to the second computing device. The computer system repeats this process until the computer system has sent all of the obfuscated data files, and the trace files that correspond to the obfuscated data files, to the computing devices of block 220.

The data movement process that is enabled by the computer system sending the obfuscated data files and the trace files can be any of various data movement processes. For example, the data movement process that is enabled at block 220 can be the method depicted in flow diagram 400 of FIG. 4, among others. As previously discussed, in order for an attacker to successfully obtain access to data protected by the disclosed technology, the attacker must first gain access to all the obfuscated data files needed to regenerate the protected data. In some embodiments, the data movement process includes randomly, semi-randomly, deterministically, etc. moving the obfuscated data files amongst a pool or set of computing devices. As a result, locating the obfuscated data files is prohibitively difficult, as any of the obfuscated data files can be located on any of the computing devices.

Further, unless an attacker can freeze all the computing devices, which can be located on networks of multiple independent businesses, it is practically impossible to obtain all of the obfuscated data files needed to regenerate particular source data. For example, where source data is obfuscated to create ten obfuscated data files, the obfuscated data files can each initially be located on ten different computing devices, a first computing device through a tenth computing device. At that time, an attacker gains access to the first computing device, and is able to obtain copies of all files on the first computing device. The attacker at a later time is able to gain access to the tenth computing device. However, the obfuscated data file that was originally at the tenth computing device has been moved to an eleventh computing device, where the obfuscated data file has been renamed with another random name, and has been encrypted once again.

As this example helps to demonstrate, unless an attacker can freeze all the computing devices at the same or substantially the same time, it becomes practically impossible to obtain copies of all of the needed obfuscated data files. In some embodiments where all of the obfuscated data files are needed to regenerate the source data, any attacker that does not possess all of the obfuscated data files is effectively prevented from successfully regenerating the source data. Further, even if an attacker were able to simultaneously freeze all the computing devices and obtain all data of a data store containing 10,000 files protected with a version of the disclosed technology, a brute force attack on the data store would have to sift through about $2^{476}$ combinations of parts, as per an earlier discussed example. Additionally, the simultaneous freeze could occur when an obfuscated data file is in the middle of being moved. In such a case, the attacker may not obtain a usable copy of the obfuscated data file, as the data that comprises the file may not be fully stored, but rather may be partially stored and partially in the process of being moved between computing devices.

At block 225, the computer system cleans up the obfuscated data files and the trace files. Cleaning up a selected file can include any of deleting the selected file, zero-ing out data of the selected file, freeing up storage space previously utilized to store the selected file, eliminating a pointer(s) to the selected file, etc.

Figure 4:
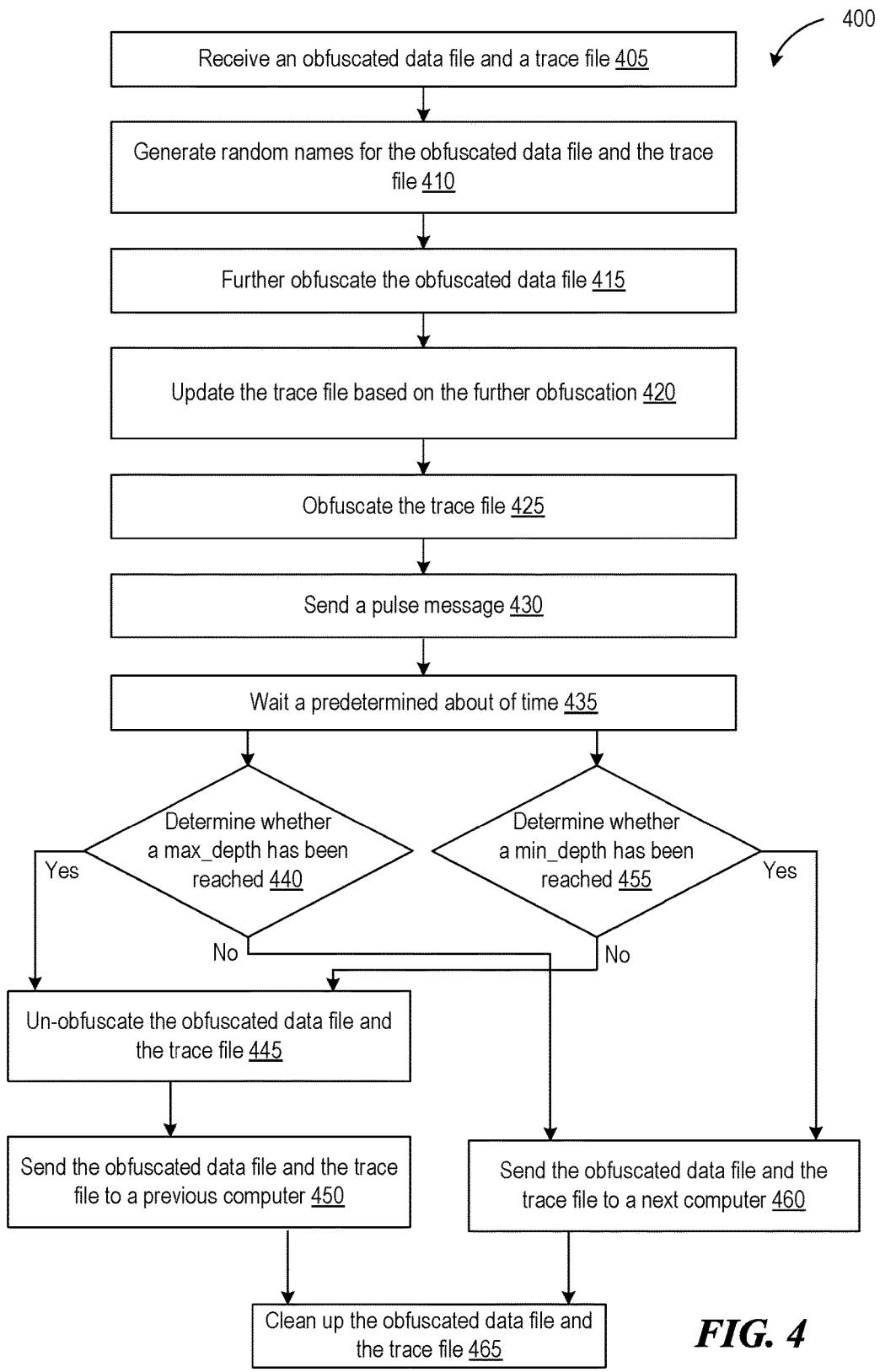
FIG. 4 is a flow diagram that illustrates a method for a data movement process, consistent with various embodiments.

FIG. 4 is a flow diagram that illustrates a method for a data movement process, consistent with various embodiments. The data movement process of FIG. 4 can be the data movement process that is enabled at block 220 of FIG. 2, among others. At block 405, a computing device receives an obfuscated data file and a trace file. The computing device of FIG. 4 can be any of devices 125, 130, 155, or 185 of FIG. 1, among others. At block 410, the computing device generates a name for the obfuscated data file, and another for the trace file, received at block 405. Each name can be generated in any of various ways, such as by being randomly generated, semi-randomly generated, deterministically generated, etc. As previously discussed, a randomly generated name can be generated in any of various ways, such as being generated so as to be unique, being generated randomly but in a pre-determined fashion, etc.

At block 415, the computing device further obfuscates the obfuscated data file to create a modified version of the obfuscated data file. As previously discussed, obfuscating selected data includes transforming the selected data, or a version of the selected data, via execution of one or more algorithms, such as a compression algorithm, a data partitioning algorithm, an encryption algorithm, a bit-scattering algorithm, a data permutation algorithm, a cyclical exclusive-or (XOR) algorithm, etc. Obfuscating selected data can further include transforming the selected data by adding random data to the selected data or a version of the selected data. In an example, the computing device obfuscates the obfuscated data file by applying an encryption algorithm that takes the obfuscated data file and an encryption key as input, and that outputs the modified version of the obfuscated data file. In this example, the encryption key is used for encrypting data exclusively by the computing device, and is exclusive to the computing device.

At block 420, the computing device updates the trace file based on the further obfuscation (i.e., the further obfuscation of block 415). The update of the trace file enables the obfuscation of block 415 to be reversed, such that the obfuscated data file received at block 405 can be regenerated. In an example, the computing device updates the trace file with encryption information that enables the encryption of block 415 to be reversed (e.g., that enables an encrypted file that is the output of block 415 to be decrypted). The trace file can further be updated with identifying information for the modified version of the obfuscated data file, such as a hash value of the modified version of the obfuscated data file. The identifying information enables the modified version of the obfuscated data file to be positively identified. For example, the trace file can be updated with information as to the particular encryption algorithm used, any parameters that were used by the encryption algorithm, information as to the encryption key used, a hash value that is generated by a hash algorithm based on the contents of the modified version of the obfuscated data file and that enables positive identification of the modified version of the obfuscated data file, etc.

At block 425, the computing device obfuscates the trace file to create a modified version of the trace file. In an example, the computing device obfuscates the trace file by applying an encryption algorithm that takes the trace file and an encryption key as input, and that outputs the modified version of the obfuscated data file.

At block 430, the computing device sends a pulse message. A pulse message is a message sent to a selected computer system to notify the selected computer system of a location of a trace file or an obfuscated data file, or a selected version of a trace file or an obfuscated data file. The pulse message can include an identifier for the computing device, such as an Internet Protocol (IP) address of the computing device, a name of the computing device, a Media Access Control (MAC) address of a network interface of the computing device, a serial number of the computing device or a hardware component of the computing device, etc., The identifier can enable a reduction in a time duration needed to retrieve the obfuscated data file or the trace file. The selected computer system can be a computer system that received an initial request to protect the source data, among others. For example, the selected computer system can be the computer system of block 205 of FIG. 2.

Figure 5:
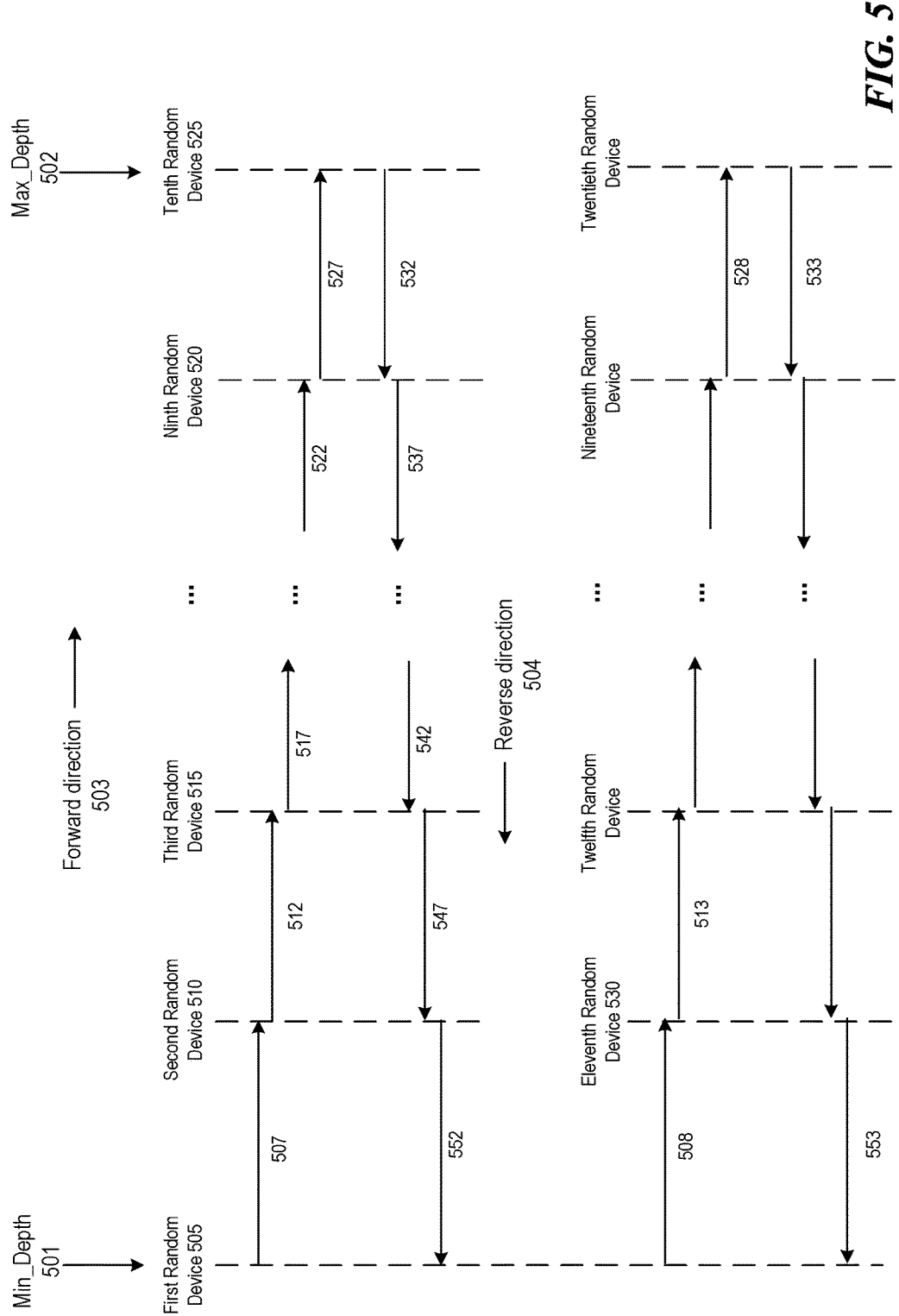
FIG. 5 is an illustration depicting data being moved between various computing devices, consistent with various embodiments.

In some embodiments, a pulse message follows a same path as was followed by a trace file or an obfuscated data file as the trace file or the obfuscated data file were moved via the data movement process of FIG. 4. The pulse message leaves a pulse track file on each computing device through which the pulse message travels on its path to the computing system of origination (e.g., the computer system of step 205 of FIG. 2). FIG. 5 shows an example of an obfuscated data file being moved between various computing devices via multiple executions of a data movement process. Each pulse track file can contain a link to a previous pulse track file thus comprising a pulsing track that can lead from the selected computer system to a current location of the trace file or obfuscated data file.

When a user retrieves a saved file from a data store protected by the disclosed technology, a retrieving computer system can follow pulsing tracks from the selected computer system towards current locations of all trace files or obfuscated data files, and can deliver those trace files or obfuscated data files back to the retrieving computer system. The retrieving computer system can, based on information in the retrieved trace files, combine the obfuscated data files, and reverse the obfuscation process to generate the source data.

In some embodiments, a name of a selected pulse track file, also referred to as a pulse file, can be cryptographically derived from the name of the selected trace file that initiates the pulse message. Therefore, in embodiments where trace file names never repeat, the pulse track files for different obfuscated data files never repeat their names. The pulse track files can be temporary. For example, a particular computer system can delete an existing pulse track file each time a new pulse, based on the same obfuscated data file or trace file, travels through the particular computer system. In some embodiments, pulse track files continuously change their names, disappear, and reappear under different names in the data store. In such embodiments, the difficulty of a brute force attack on the pulse track files is very similar to an attack on the obfuscated data files.

At block 435, the computing device waits a predetermined amount of time. In some embodiments, a user sets the predetermined amount by inputting the predetermined amount of time into a configuration file, and the computing device accesses the configuration file, or a file derived from the configuration file, to determine the predetermined amount of time. In other embodiments, the predetermined time, after being set by a user, is added to a trace file, and the computing device accesses the trace file to determine the predetermined amount of time. In yet other embodiments, the predetermined amount of time is randomly, semi-randomly, or deterministically determined, among others.

At block 440, the computing device determines whether a max_depth has been reached. The data movement process illustrated in flow diagram 400 can be executed multiple times by multiple computing devices. For example, a first computing device can receive an obfuscated data file and a trace file, apply the method of flow diagram 400, and send the further obfuscated data file and trace file to a next computing device, which can apply the method of flow diagram 400, and send the even further obfuscated data file and trace file to another next computing device, etc.

In some embodiments, such as embodiments where the obfuscated data file is moved less often (e.g., once a month), the application of block 415 at each data movement may not be overly prohibitive, as regenerating source data would only require reversing the effects of a limited number of obfuscations due to the low movement frequency. In other embodiments, such as embodiments where the obfuscated data is moved often (e.g., once every hour), the application of block 415 at each data movement could become prohibitive, as regenerating source data could require reversing the effects of a very large number of obfuscations due to the high movement frequency. If the obfuscated data file were moved once an hour for a year (following the process of flow diagram 400), block 415 could be applied over 8,000 times, and regenerating source data could require reversing the effects of over 8,000 obfuscations. Reversing the effects of over 8,000 obfuscations to regenerate the source data could be prohibitively expensive computationally and time-wise, due to the significant amount of compute resources and time required to reverse the over 8,000 obfuscations. For example, when the obfuscation of block 415 includes executing an encryption algorithm, revering the effects of the over 8,000 encryptions can require executing over 8,000 decryptions.

To prevent such a situation from happening, in some embodiments, a maximum depth (max_depth) value is defined. The max_depth value sets a limit as to a maximum number of times that the obfuscation of block 415 will be applied to versions of an obfuscated data file during the data movement process. Similarly, a min_depth value sets a limit as to a minimum number of times that the obfuscation of block 415 will be applied to versions of an obfuscated data file during the data movement process. In some embodiments, max_depth can only be reached when a data movement process is going in a forward direction, such as when a data movement process executed per FIG. 5 is going in forward direction 503. It is helpful to refer at this time to the example of FIG. 5. FIG. 5 is an illustration depicting data being moved between various computing devices, consistent with various embodiments.

In the example of FIG. 5, first random device 505 accomplishes an initial obfuscation of source data to be protected and enables a data movement process, such as by executing the method of FIG. 2. After accomplishing the initial obfuscation of the source data to create multiple obfuscated data files (e.g., per block 210), and accomplishing an initial generation of the trace files (e.g., per block 215), first random device 505 sends one of the obfuscated data files and an associated trace file to second random device 510 (step 507) to enable the data movement process, which starts in a forward direction (e.g., forward direction 503). Second random device 510 continues the data movement process in the forward direction (e.g., forward direction 503) by sending a second generation obfuscated data file (e.g., created at block 415) and an associated trace file (e.g., created at block 425) to third random device 515 (step 512), which continues the data movement process (step 517). A second generation obfuscated data file is a version of the obfuscated data file. In some embodiment, a second generation obfuscated data file is the version of the obfuscated data file after block 415 has been executed twice based on the obfuscated data file.

The data movement process continues with ninth random device 520 receiving an eighth generation obfuscated data file (step 522) and continuing the data movement process by sending a ninth generation obfuscated data file and an associated trace file to tenth random device 525 (step 527). Tenth random device 525 further obfuscates the ninth generation obfuscated data file (e.g., created at block 415) to create a tenth generation obfuscated data file. After waiting a predetermined amount of time (e.g., per block 435), tenth random device 525 determines that max_depth, which is set to 10 in this example, has been reached (e.g., per block 440).

Upon determining that the max_depth has been reached, the data movement process continues in a reverse direction (e.g., reverse direction 504) until min_depth is reached. Tenth random device 525 un-obfuscates the obfuscated data file (e.g., per block 445), to regenerate the ninth generation obfuscated data file, and sends the ninth generation obfuscated data file to ninth random device 520 (step 532, also e.g., per block 450), which continues the data movement process in reverse direction 504 (step 537). The data movement process continues in reverse, with third random device 515 receiving a regenerated third generation obfuscated data file (step 542), un-obfuscating the third generation obfuscated data file (e.g., per block 445), to regenerate the second generation obfuscated data file, and sending the regenerated second generation obfuscated data file to second random device 510 (step 547). Second random device 510 un-obfuscates the regenerated second generation obfuscated data file (e.g., per block 445), to regenerate the first generation obfuscated data file, and sends the regenerated first generation obfuscated data file to first random device 505 (step 553).

First random device 505 then determines that min_depth, which is set to 1 in this example, has been reached. Upon determination that the min_depth has been reached, the data movement process continues in forward direction 503 again, with first random device 505 sending a new second generation obfuscated data file and an associated trace file to eleventh random device 530 (step 508), which continues the data movement process in forward direction 503 (step 513). This process continues until, after step 528, max_depth is once again reached, at which time the data movement process is once again continued but in reverse direction 504 (step 533), until, after step 553, min_depth is once again reached, at which time the data movement process once again continues in forward direction 503.

It is noted that, in some embodiments, when the data movement process continues in the reverse direction, an obfuscated data file received at block 405 is obfuscated (block 415) before being stored. This avoids a case where an obfuscated data file exists on a particular computing device in a same state (e.g., with the same encrypted data) as it existed during the forward direction. As a result, an attacker will not be able to spot a same obfuscated data file on a particular computing device when the obfuscated data file is received by the computing device in the reverse direction.

Returning to the discussion of FIG. 4, at block 445, the computing device un-obfuscates the obfuscated data file and the trace file, or a modified version of the obfuscated data file and the trace file. A modified version of the obfuscated data file and the trace file were, respectively, created earlier at blocks 415 and 425. At block 445, the computing device reverses the obfuscation process to regenerate the obfuscated data file and the trace file (prior to the obfuscations of blocks 415 and 425). In embodiments where the identifying information of the trace file enables data of the obfuscated data file to be uniquely verified, such as when the identifying information is a hash value, the hash value of the trace file can be compared to a hash value calculated based on the data of the obfuscated data file. When the hash values do not match, the computing device can make a determination that the obfuscated data file was improperly modified and that a security breach occurred. The computing device can further determine that the previous computing device (i.e., the one that sent the improperly modified obfuscated data file to the current computing device) is a non-trusted computer, and can add identifying information for the previous computing device to a trusted computer database, which is a database that enables identification of trusted and non-trusted computers.

At block 450, the computing device sends the regenerated obfuscated data file and trace file to a previous computing device. The previous computing device can be a computing device from which the obfuscated data file and the trace file were received at block 405. In some embodiments, in order to un-obfuscate an obfuscated data file, the obfuscated data file needs to be sent to a particular computing device. For example, when a particular computing device obfuscates a file by encrypting a file based on a private key, decrypting the file may require sending the file to the particular computing device, as the particular computing device may be the only computing device that has access to the private key that was used to encrypt the file.

At block 465, the computing device cleans up the obfuscated data file and the trace file. Cleaning up a selected file can include any of deleting the selected file, zero-ing out data of the selected file, freeing up storage space previously utilized to store the selected file, eliminating a pointer(s) to the selected file, etc. At block 455, the computing device determines whether a min_depth has been reached. The min_depth can be, for example, min_depth 501 of FIG. 5. In some embodiments, min_depth can only be reached when a data movement process is going in a reverse direction, such as when a data movement process of FIG. 5 is going in reverse direction 504. At block 460, the computing device sends the obfuscated data file and the trace file, or a version of the obfuscated data file and the trace file, to a next computing device. In some embodiments, the computing device randomly, semi-randomly, deterministically, etc. selects the next computing device from a set of computing devices. The set of computing devices can be, for example, any of devices A 125, 130, 155, or 185 of FIG. 1, among others.

Figure 6:
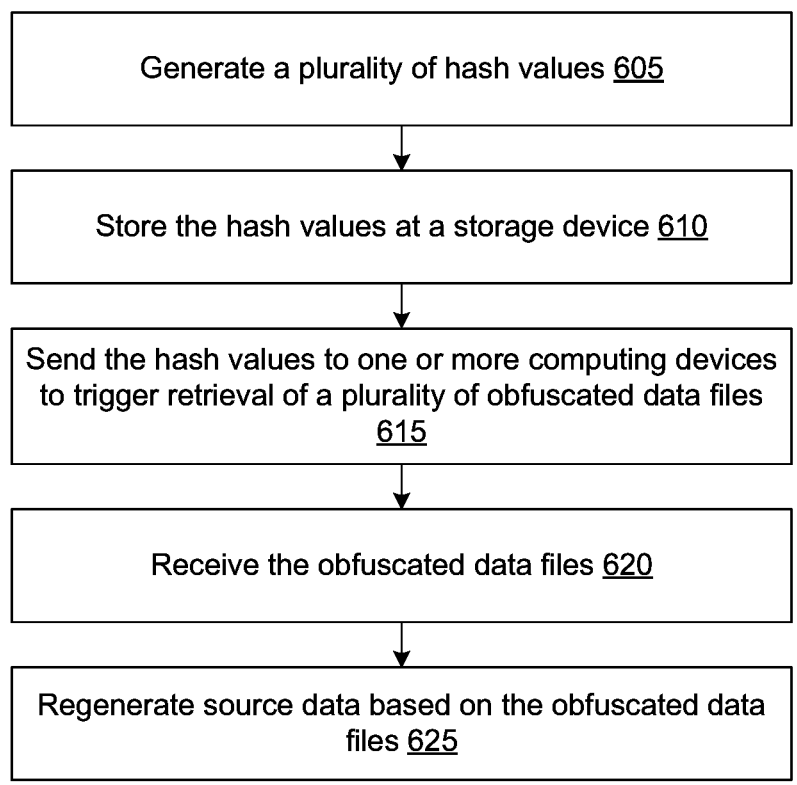
FIG. 6 is a flow diagram that illustrates a method for regenerating source data, consistent with various embodiments.

FIG. 6 is a flow diagram that illustrates a method for regenerating source data, consistent with various embodiments. The method of FIG. 6 can be executed in conjunction with the method of FIG. 2. At block 605, a computer system, such as the computer system of FIG. 2, generates a plurality of hash values. The hash values can be the identifying information that is included, in some embodiments, in the trace files generated at block 215. Each of the hash values is generated by executing a hash algorithm based on contents of the a different one of the multiple obfuscated data files of block 210. In embodiments where each of the trace files of block 215 includes identifying information, and the identifying information is a hash value, when the obfuscated data files and trace files are sent at block 220, the trace file includes the hash value, which can be used to uniquely identify the obfuscated data file.

At block 610, the computer system stores the hash values at a storage device. The hash values can be stored in any of various ways. For example, the hash values can be stored in one or more files, in a database, etc. The one or more files, or the database can be encrypted or otherwise obfuscated. At block 615, the computer system sends the hash values to computing devices, such as the computing devices of block 220. In some embodiments, such as embodiments where the computer system receives pulse messages, the computer system sends one or more of the hash values to a computing device based on an identifier received via a pulse message. The identifier can be the identifier of block 430 of FIG. 4, and can uniquely identify the computing device that sent the pulse message that included the identifier.

When a particular computing device receives a hash value, the computing device can compare the hash value to the hash value of any of the trace files to which the computing device has access. When the received hash value matches the hash value of a trace file, the computer system can initiate a process to return the obfuscated data file that maps to the trace file to the computer system. Because the obfuscated data file is being moved as part of a data movement process that adds an additional layer of obfuscation with each data move, the process of returning the obfuscated data file can follow the data movement process, but in reverse. For example, referring to FIG. 5, if tenth random device 525 received the hash value, and if the hash value matched the hash value of a trace file received at step 527, then the obfuscated data file received at step 527 can be returned by moving the obfuscated data file and the trace file in reverse direction 504, such as via step 532, then step 537, etc., until the trace file and the obfuscated data file reach the computer system.

At block 620, the computer system receives the obfuscated data files, and the trace files associated with the obfuscated data files. At block 625, the computer system regenerates the source data based on the obfuscated data files and the trace files. Because a trace file includes information as to how the obfuscated data file to which the trace file maps was created, the computer system can use the information of the trace file to reverse an obfuscation process for the obfuscated data file that maps to the trace file. For example, when the obfuscated data files were generated at block 215 of FIG. 2, the computer system can regenerate the source data of block 205 based on the obfuscated data files of block 210, and the trace files of block 215.

Figure 7:
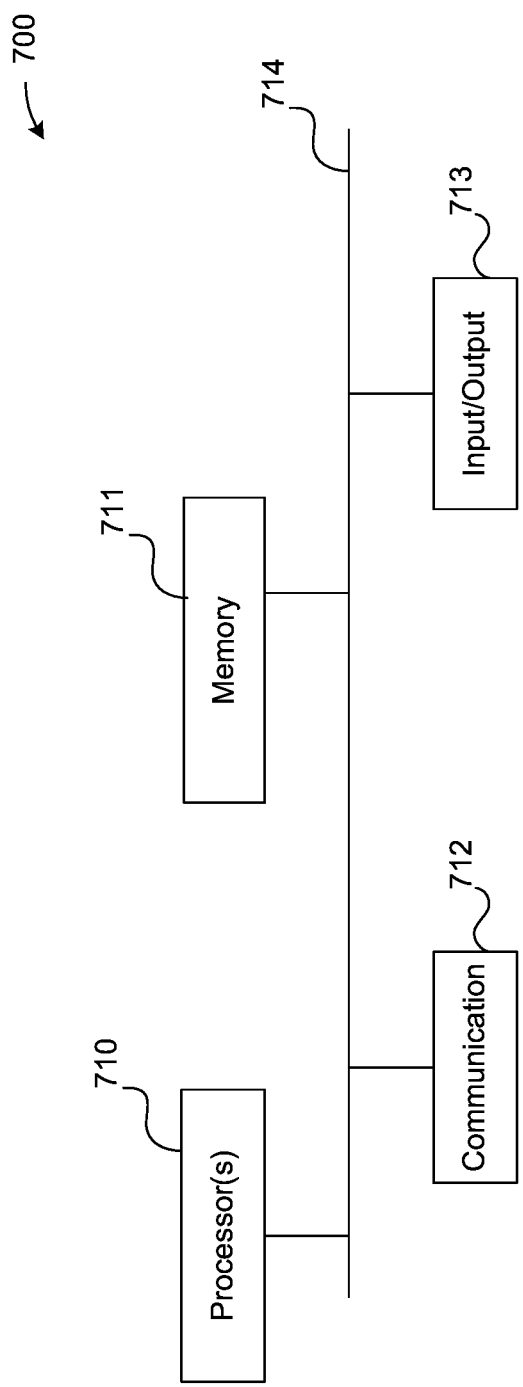
FIG. 7 is a block diagram illustrating an example of a processing system in which at least some operations described herein can be implemented, consistent with various embodiments.

FIG. 7 is a high-level block diagram illustrating an example of a processing system in which at least some operations described herein can be implemented, consistent with various embodiments. The processing system can be processing device 700, which represents a system that can run any of the methods/algorithms described above. For example, processing device 700 can be any of devices 125, 130, 155, or 185 of FIG. 1, among others. A system may include two or more processing devices such as represented in FIG. 7, which may be coupled to each other via a network or multiple networks. A network can be referred to as a communication network.

In the illustrated embodiment, the processing device 700 includes one or more processors 710, memory 711, a communication device 712, and one or more input/output (I/O) devices 713, all coupled to each other through an interconnect 714. The interconnect 714 may be or include one or more conductive traces, buses, point-to-point connections, controllers, adapters and/or other conventional connection devices. Each of the processors 710 may be or include, for example, one or more general-purpose programmable microprocessors or microprocessor cores, microcontrollers, application specific integrated circuits (ASICs), programmable gate arrays, or the like, or a combination of such devices. The processor(s) 710 control the overall operation of the processing device 700. Memory 711 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 711 may store data and instructions that configure the processor(s) 710 to execute operations in accordance with the techniques described above. The communication device 712 may be or include, for example, an Ethernet adapter, cable modem, Wi-Fi adapter, cellular transceiver, Bluetooth transceiver, or the like, or a combination thereof. Depending on the specific nature and purpose of the processing device 700, the I/O devices 713 can include devices such as a display (which may be a touch screen display), audio speaker, keyboard, mouse or other pointing device, microphone, camera, etc.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Physical and functional components (e.g., devices, engines, modules, and data repositories, etc.) associated with processing device 700, any of devices 125, 130, 155, or 185, etc., can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

The invention claimed is:

1. A method for providing data security services by a data movement network, the method comprising:
    obtaining a source data;
    partitioning the source data into a plurality of data shards;
    performing an obfuscation operation on each data shard of the plurality of data shards to create a plurality of obfuscated data shards;
    generating a plurality of hash values by executing a hash algorithm on the contents of each of the obfuscated data shards, each hash value identifying a corresponding obfuscated data shard from the plurality of obfuscated data shards, the hash value generated and stored in a network device;
    generating a plurality of trace files, each trace file corresponding to an obfuscated data shard from the plurality of obfuscated data shards and including:
        obfuscation information that maps to the obfuscated data shard including data identifying the obfuscation operation performed on the obfuscated data shard, and enables regeneration of the source data based on the plurality of obfuscated data shards, and
        the hash value identifying the obfuscated data shard; and
    transmitting the plurality of obfuscated data shards and the plurality of trace files to a first plurality of network devices in the data movement network, wherein each of the obfuscated data shards are subsequently modified, each of the corresponding trace files are updated based upon the modification, and the modified obfuscated data shards and updated corresponding trace files are transmitted by the first plurality of network devices to a second plurality of network devices.

2. The method of claim 1, wherein the obfuscation operation includes performing one or more of the following operations on the source data and/or the plurality of data shards: encrypting the data, renaming the file using a name that is cryptographically generated, adding random data to the, cyclically exclusive-or'ing (XOR'ing) the data, compressing the data, applying a permutation algorithm to the data, and applying a bit-scattering algorithm to the data.

3. The method of claim 1, further comprising:
    retrieving the plurality of obfuscated data shards and the plurality of trace files by sending the corresponding stored hash values to the first plurality of network devices to trigger the transmission of the plurality of obfuscated data shards from the first plurality of network devices to the network device;

regenerating the plurality of the data shards by reversing the obfuscation process on each of the obfuscated data shards using the plurality of trace files; and regenerating the source data by combining the plurality of regenerated data shards.

4. The method of claim 3, further comprising:

computing the hash value of a regenerated data shard from the plurality of regenerated data shards by executing a hash algorithm on the contents of the regenerated data shard;

comparing the computed hash value with the hash value stored in the network device; and determining whether the regenerated data shard has been modified.

5. The method of claim 4, further comprising:

designating the network device that provided the obfuscated data shard used to produce the regenerated data shard as an un-trusted computer when the regenerated data shard is determined to have been modified.

6. A method for providing data security services, the method comprising:

obtaining a source data;

performing an obfuscation operation to partition the source data into a plurality of obfuscated data shards;

generating a plurality of trace files, each trace file based on a corresponding obfuscated data shard from the plurality of obfuscated data shards and including:
 obfuscation information that maps to the obfuscated data shard including data identifying the obfuscation operation performed on the obfuscated data shard, and enables regeneration of the source data based on the plurality of obfuscated data shards, and
 a hash value identifying the corresponding obfuscated data shard from the plurality of obfuscated data shards, the hash value generated by executing a hash algorithm based on the contents of the corresponding obfuscated data shard; and sending each of the plurality of obfuscated data shards and each of the plurality of trace files to a plurality of network devices in the data movement network.

7. The method of claim 6, further comprising:

storing each hash value identifying a corresponding obfuscated data shard in the network device;

retrieving each of the plurality of obfuscated data shards and each of the plurality of trace files by transmitting the stored hash values to the plurality of network devices to trigger the transmission of the plurality of obfuscated data shards from the plurality of network devices;

regenerating the plurality of the data shards by reversing the obfuscation process on each of the obfuscated data shards using the plurality of trace files; and.

regenerating the source data by combining the plurality of regenerated data shards.

8. The method of claim 7, wherein triggering the transmission of the plurality of obfuscated data shards at a second network device from among the plurality of network devices occurs by:

identifying, at the second network device, a first trace file with a hash value that matches a hash value from the plurality of transmitted hash values; and transmitting, at the second network device, the obfuscated data shard corresponding to the first trace file to the network device.

9. The method of claim 6, wherein the obfuscation operation further includes encrypting the source data and/or plurality of obfuscated data shards.

10. The method of claim 6, wherein the obfuscation operation further includes renaming the source data and/or plurality of obfuscated data shards using a name that is randomly or cryptographically generated.

11. The method of claim 6, wherein the obfuscation operation further includes cyclically exclusive-or'ing (XOR'ing) the source data and/or plurality of obfuscated data shards.

12. The method of claim 6, wherein the obfuscation operation further includes adding random data to the source data and/or plurality of obfuscated data shards.

13. The method of claim 6, wherein the obfuscation operation further includes applying one or more of: a permutation algorithm, bit-scattering algorithm, and compression algorithm to the source data and/or plurality of obfuscated data shards.

14. The method of claim 6, further comprising:

cleaning up of the source data, one or more of the plurality of obfuscated data shards, or one or more of the plurality of trace files by performing on or more of the following: deleting the data or file, zero-ing out data of the data or file, freeing up storage space previously utilized to store the data or file, and eliminating pointers to the data or file.

15. The method of claim 6, wherein:

the source data is one of a second plurality of obfuscated data shards received from a second network device and is derived from a second source data via execution of one or more of the following on the second source data: an encryption algorithm, a data partitioning algorithm, a compression algorithm, a bit-scattering algorithm, a data padding algorithm, and a cyclical exclusive-or (XOR) algorithm.

16. A computer system comprising:

a processor;

a network interface coupled to the processor; and a memory coupled to the processor and having instructions executable by the processor to cause the server to:
 obtain a source data;
 partition the source data into a plurality of data shards;
 perform an obfuscation operation on each data shard of the plurality of data shards to create a plurality of obfuscated data shards;
 generate a plurality of hash values by executing a hash algorithm based on the contents of a corresponding obfuscated data shard, each hash value identifying the corresponding obfuscated data shard from the plurality of obfuscated data shards, the hash value generated and stored in the computer system;
 generate a plurality of trace files, each trace file corresponding to an obfuscated data shard from the plurality of obfuscated data shards and including obfuscation information that maps the obfuscated data shard, includes data identifying the obfuscation operation performed on the obfuscated data shard, and enables regeneration of the source data based on the plurality of obfuscated data shards; and
 transmit the plurality of obfuscated data shards and the plurality of trace files to a first plurality of network devices in the data movement network.

17. The computer system of claim 16, wherein the memory stores instructions executable by the processor to cause the server to:

retrieve each of the plurality of obfuscated data shards and each of the plurality of trace files by sending the stored hash values to the plurality of network devices to trigger the transmission of the plurality of obfuscated data shards from the plurality of network devices to the network device;

regenerate the plurality of the data shards by reversing the obfuscation process on each of the obfuscated data shards using the plurality of trace files; and regenerate the source data by combining the plurality of regenerated data shards.

18. The computer system of claim 16, wherein the obfuscation operation includes performing one or more of the following operations on the source data and/or the plurality of data shards: encrypting each file, renaming each file using a name that is cryptographically generated, adding random data to each file, cyclically exclusive-or'ing (XOR'ing) each file, compressing each file, applying a permutation algorithm to each file, and applying a bit-scattering algorithm to each file.

19. The computer system of claim 16, wherein each of the obfuscated data shards are subsequently modified, each of the corresponding trace files are updated based upon the modification, and the modified obfuscated data shards and updated corresponding trace files are transmitted to a second plurality of network devices.

20. The computer system of claim 16, wherein the source data may include one or more of: audio data, text data, image data, video data, word processing data, and mathematical processing data.

21. The computer system of claim 16, wherein the source data may include a data stream from one or more of: a keyboard, a microphone, a camera, word processor application, a spreadsheet application, a voice recognition application, and an optical recognition application.

22. A method for securing a plurality of source data via ongoing periodic movement and obfuscation of data, the method comprising:

receiving, by a network device, an obfuscated data shard of a plurality of obfuscated data shards derived from a source data;

receiving, by the network device, a trace file of a plurality of trace files associated with the plurality of obfuscated data shards, wherein regeneration of the source data requires data from each of the plurality of trace files and data from each of the plurality of obfuscated data shards;

further obfuscating, by the network device, the obfuscated data shard to create a modified version of the obfuscated data shard;

updating, by the network device, the trace file with obfuscation information regarding said further obfuscating of the obfuscated data shard to enable regeneration of the source data based on the modified version of the obfuscated data shard;

further obfuscating, by the network device, the trace file to create a modified version of the trace file; and sending, by the network device, the modified version of the obfuscated data shard and the modified version of the trace file to a second network device; and cleaning up, by the network device, the modified version of the obfuscated data shard and/or the modified version of the trace file, wherein cleaning up the modified version of the obfuscated data shard and the modified version of the trace file includes one or more of: deleting the modified version of the obfuscated data or the modified version of the trace file, zero-ing out data of the modified version of the obfuscated data shard or the modified version of the trace file, freeing up storage space previously utilized to store the modified version of the obfuscated data shard or the modified version of the trace file, and eliminating pointers to the modified version of the obfuscated data shard or the modified version of the trace file.

23. The method of claim 22, wherein the source data may include one or more of: audio data, text data, image data, video data, word processing data, and mathematical processing data.

24. The method of claim 22, wherein the network device periodically and persistently receives, further obfuscates, and sends obfuscated data shards derived from a plurality of source data to protect data of the source data; and wherein the network device periodically and consistently receives, updates, further obfuscates, and sends trace files associated with the plurality of source data to enable regeneration of the source data.

25. The method of claim 22, wherein the further obfuscating includes performing one or more of the following operations on the obfuscated data shard and/or the trace file includes one or more of: encrypting the file, renaming the file using a name that is cryptographically generated, adding random data to the file, cyclically exclusive-or'ing (XOR'ing) the file, compressing the file, applying a permutation algorithm to the file, and applying a bit-scattering algorithm to the file.

26. The method of claim 22, wherein the trace file includes a hash value identifying the corresponding obfuscated data shard from the plurality of obfuscated data shards, the hash value generated by executing a hash algorithm based on the contents of the corresponding obfuscated data shard.

27. The method of claim 22, wherein triggering the transmission of the plurality of obfuscated data shards at a second network device from among the plurality of network devices occurs by:

identifying, at the second network device, a first trace file with a hash value that matches a hash value from the plurality of transmitted hash values; and transmitting, at the second network device, the obfuscated data shard corresponding to the first trace file to the network device.

28. The method of claim 22, wherein the source data may include a data stream from one or more of: a keyboard, a microphone, a camera, word processor application, a spreadsheet application, a voice recognition application, and an optical recognition application.

* * * * *